United States Patent
Otsu

(10) Patent No.: US 9,330,409 B2
(45) Date of Patent: May 3, 2016

(54) INFORMATION PROCESSING APPARATUS, INFORMATION PROCESSING METHOD, AND INFORMATION PROCESSING PROGRAM

(71) Applicant: Rakuten, Inc., Shinagawa-ku, Tokyo (JP)

(72) Inventor: Kentaro Otsu, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/238,656

(22) PCT Filed: Dec. 27, 2012

(86) PCT No.: PCT/JP2012/083938
§ 371 (c)(1),
(2) Date: Feb. 12, 2014

(87) PCT Pub. No.: WO2014/002318
PCT Pub. Date: Jan. 3, 2014

(65) Prior Publication Data
US 2014/0201036 A1 Jul. 17, 2014

(30) Foreign Application Priority Data

Jun. 27, 2012 (JP) ................. 2012-143937

(51) Int. Cl.
*G06Q 30/06* (2012.01)
*G06Q 10/10* (2012.01)
*G06Q 10/00* (2012.01)
*G06Q 30/00* (2012.01)
*G06F 21/10* (2013.01)
*G06Q 30/02* (2012.01)

(52) U.S. Cl.
CPC ............ *G06Q 30/0625* (2013.01); *G06F 21/10* (2013.01); *G06Q 10/00* (2013.01); *G06Q 10/10* (2013.01); *G06Q 30/00* (2013.01); *G06Q 30/0255* (2013.01)

(58) Field of Classification Search
CPC ... G06Q 30/00; G06Q 30/0625; G06Q 10/00; G06Q 10/10; G06F 21/10
USPC .......................... 705/26.1, 26.62, 26.53, 26.7
See application file for complete search history.

(56) References Cited

U.S. PATENT DOCUMENTS

2005/0060664 A1* 3/2005 Rogers .................. G06F 3/0481
715/810
2009/0312009 A1* 12/2009 Fishel ........................... 455/425
2012/0272136 A1* 10/2012 Takami ......................... 715/234

FOREIGN PATENT DOCUMENTS

JP 2007-4518 A 1/2007

OTHER PUBLICATIONS

International Search Report for PCT/JP2012/083938 dated Jan. 29, 2013.

Primary Examiner — Yogesh C Garg
(74) Attorney, Agent, or Firm — Sughrue Mion, PLLC

(57) ABSTRACT

It is made possible that a user easily find a part which the user wants to see from contents of information of an item for sale purchased by the user. An information processing apparatus determines whether or not a user who requests contents including information of an item for sale has purchased the item for sale. Further, the information processing apparatus identifies a part that has been seen in the contents on the basis of a history indicating at least a displayed part of the contents after purchase of the item for sale. Then, the information processing apparatus causes the contents to be displayed in a state in which the identified part is seen more preferentially when it is determined that the user has purchased the item for sale than when it is determined that the user has not purchased the item for sale.

12 Claims, 10 Drawing Sheets

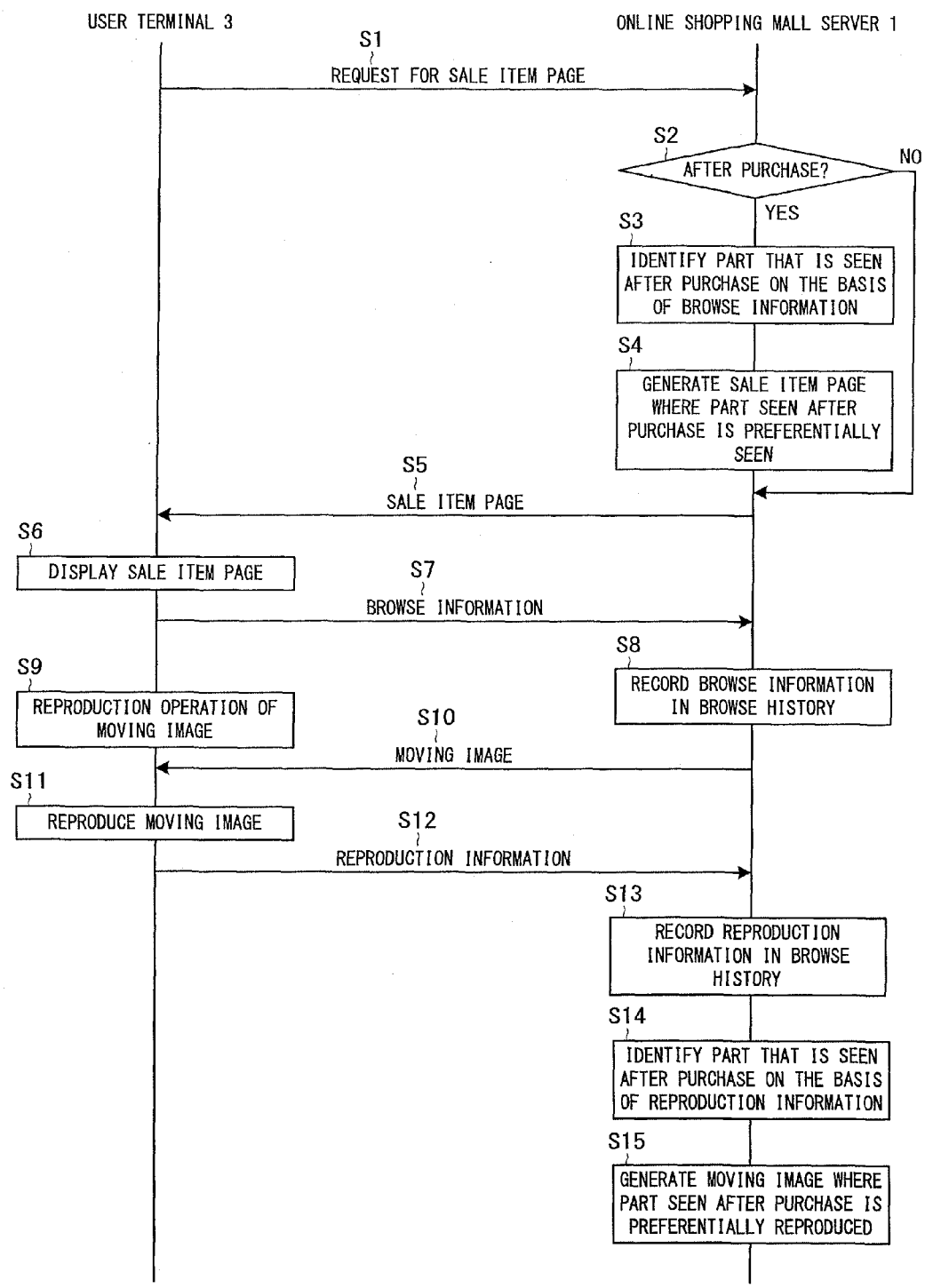

FIG.7A
MEMBER INFORMATION DB  12a

| USER ID |
| --- |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |

FIG.7B
SALE ITEM INFORMATION DB  12b

| SHOP ID | |
| --- | --- |
| SALE ITEM ID | |
| CATEGORY ID | |
| SALE ITEM NAME | |
| SALE ITEM IMAGE | |
| DETAIL INFORMATION | |
| SALE ITEM PRICE | |
| MOVING IMAGE ID OF ORIGINAL MOVING IMAGE | |
| MOVING IMAGE ID OF EDITED MOVING IMAGE | |
| ... | |

FIG.7C
MOVING IMAGE DB  12c

| MOVING IMAGE ID |
| --- |
| REGISTRATION DATE AND TIME |
| MOVING IMAGE |

FIG.7D
BROWSE HISTORY DB  12d

| USER ID | |
| --- | --- |
| SHOP ID | |
| SALE ITEM ID | |
| DISPLAY DATE AND TIME | |
| PURCHASE STATE | |
| BROWSE INFORMATION | BROWSED PART INFORMATION |
| | BROWSING TIME |
| REPRODUCTION INFORMATION | MOVING IMAGE ID |
| | REPRODUCED PART INFORMATION |

FIG.7E
PURCHASE HISTORY DB  12e

| ORDER CODE |
| --- |
| PURCHASE DATE AND TIME |
| USER ID |
| SHOP ID |
| SALE ITEM ID |
| ... |

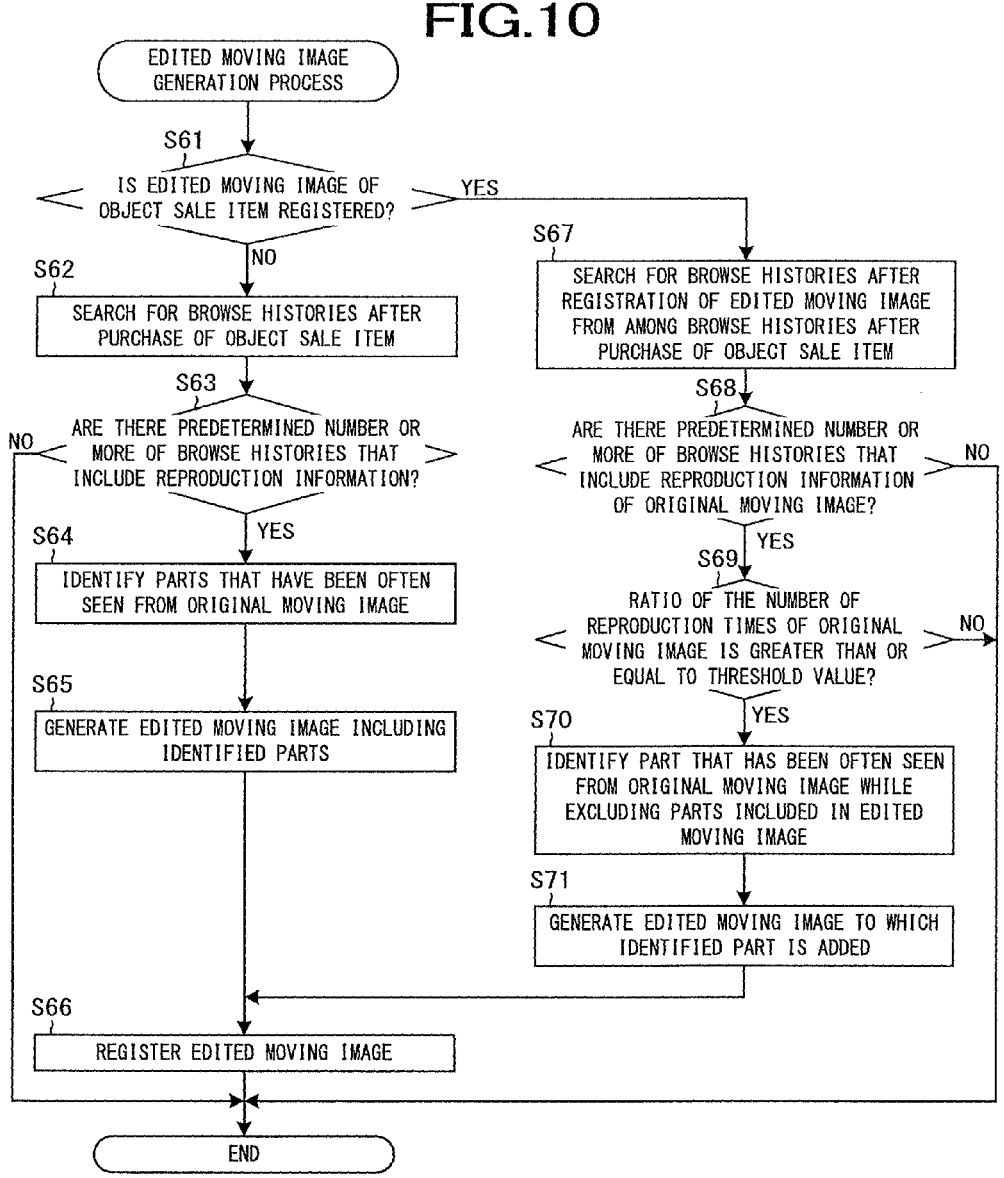

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2012/083938 filed Dec. 27, 2012, claiming priority based on Japanese Patent Application No. 2012-143937 filed Jun. 27, 2012, the contents of all of which are incorporated herein by reference in their entirety.

TECHNICAL FIELD

The present invention relates to a technical field of an information processing apparatus and an information processing method which cause contents of information of an item for sale to be displayed.

BACKGROUND ART

In recent years, electronic commerce is widely used where items for sale are sold and purchased on the Internet. When a user purchases an item for sale by using the electronic commerce, the user browses contents including information of the item for sale. Examples of the contents include a web page and a moving image. The user determines whether or not to purchase the item for sale on the basis of the information included in the contents of the item for sale. The contents of the item for sale may include various information. For example, Patent Document 1 describes that a sale item name, a sale item photograph, a price, sale item content, evaluation, a sales ranking, a shipment time, and the like are displayed on a sale item page.

CITATION LIST

Patent Document

Patent Document 1: JP 2007-4518 A

SUMMARY OF INVENTION

Technical Problem

A user may browse contents of an item for sale which the user purchased even after purchasing the item for sale. The reason of this is that information that is necessary after the purchase may be included in the contents. However, in the contents of the item for sale, parts that are not often browsed after the purchase and parts that are frequently browsed after the purchase may be mixed. Therefore, it may take time and effort for the user to find information which the user wants to browse after the purchase from the contents.

The present invention is made in view of the above situation, and an object of the present invention is to provide an information processing apparatus, an information processing method, and an information processing program that enable a user to easily find a part which the user wants to see from the contents of information of an item for sale purchased by the user.

Solution to Problem

In order to solve the above problem, the invention according to claim 1 is an information processing apparatus comprising: a determination means that determines whether or not a user who requests contents including information of an item for sale has purchased the item for sale; an identification means that identifies, on the basis of a history after the purchase of the item for sale among histories indicating at least a displayed part of the contents, a part that has been seen after purchase of the item for sale in the contents; and a control means that causes the contents to be displayed in a state in which the part identified by the identification means is seen more preferentially when it is determined by the determination means that the user has purchased the item for sale than when it is determined that the user has not purchased the item for sale.

According to the invention, when the user who requests the contents of information of an item for sale has already purchased the item for sale, the contents are displayed in a state in which a part that has been seen by someone who has purchased the same item for sale as the item for sale after purchase is more preferentially seen than when the user has not purchased the item for sale. The part that has been seen by someone who has purchased the item for sale in the contents of information of the item for sale is probably a part which the user who requests the contents this time wants to see. Therefore, the user can easily find a part which the user wants to see from the contents of information of the item for sale purchased by the user.

The invention according to claim 2 is the information processing apparatus according to claim 1, wherein the contents include at least a moving image, the identification means identifies, on the basis of the history indicating at least a reproduced part of the moving image, a part that has been seen after purchase of the item for sale in the moving image, and the control means that causes the moving image to be reproduced in a state in which the part identified by the identification means is preferentially reproduced.

According to the invention, when the user who requests the contents of information of an item for sale has already purchased the item for sale, the moving image can be reproduced in a state in which a part that has been seen by someone who has purchased the same item for sale as the item for sale after purchase is more preferentially reproduced than when the user has not purchased the item for sale. Therefore, the user can easily find a part which the user wants to see from the moving image included in the contents of information of the item for sale purchased by the user.

The invention according to claim 3 is the information processing apparatus according to claim 1 or 2, wherein the control means causes the contents to be displayed, in an area in which scrolling display of the contents can be performed, so that the part identified by the identification means is included in the area.

According to the invention, a part that has been seen by someone who has purchased an item for sale corresponding to the requested contents after purchase is displayed in the area. Therefore, the user need not perform a scroll operation to see a part which the user wants to see.

The invention according to claim 4 is the information processing apparatus according to claim 1 or 2, wherein the control means changes a position, in the contents, of the part identified by the identification means to a position that is more easily seen than other parts of the contents.

According to the invention, a part that has been seen by someone who has purchased an item for sale corresponding to the requested contents after purchase is displayed in a position that is more easily seen than other parts. Therefore, the user can easily find a part which the user wants to see.

The invention according to claim 5 is the information processing apparatus according to any one of claims 1 to 4, further comprising: a second identification means that identifies, on the basis of the history indicating a displayed part of the contents at a time when the item for sale has not been purchased, a part that has been seen in the contents, wherein the control means causes the contents to be displayed in a state in which the part identified by the second identification means is seen more preferentially when it is determined by the determination means that the user has not purchased the item for sale than when it is determined that the user has purchased the item for sale.

According to the invention, when the user who requests the contents of information of an item for sale has not yet purchased the item for sale, the contents are displayed in a state in which a part that has been seen by someone who has not purchased the same item for sale as the item for sale is more preferentially seen than when the user has purchased the item for sale. Therefore, the user can easily find a necessary part from the contents of information of the item for sale that has not purchased by the user.

The invention according to claim 6 is an information processing method performed by a computer, the method comprising: a determination step determining whether or not a user who requests contents including information of an item for sale has purchased the item for sale; an identification step identifying, on the basis of a history after the purchase of the item for sale among histories indicating at least a displayed part of the contents, a part that has been seen after purchase of the item for sale in the contents; and a control step causing the contents to be displayed in a state in which the part identified in the identification step is seen more preferentially when it is determined in the determination step that the user has purchased the item for sale than when it is determined that the user has not purchased the item for sale.

The invention according to claim 7 is an information processing program that causes a computer to function as: a determination means that determines whether or not a user who requests contents including information of an item for sale has purchased the item for sale; an identification means that identifies, on the basis of a history after the purchase of the item for sale among histories indicating at least a displayed part of the contents, a part that has been seen after purchase of the item for sale in the contents; and a control means that causes the contents to be displayed in a state in which the part identified by the identification means is seen more preferentially when it is determined by the determination means that the user has purchased the item for sale than when it is determined that the user has not purchased the item for sale.

Advantageous Effect of Invention

According to the present invention, when a user who requests contents of information of an item for sale has already purchased the item for sale, the contents are displayed in a state in which a part that has been seen by someone who has purchased the same item for sale as the item for sale is preferentially seen. Therefore, the user can easily find a part which the user wants to see from the contents of information of the item for sale purchased by the user.

BRIEF DESCRIPTION OF DRAWINGS

FIG. 3 is a sequence diagram showing a process example of the information processing system S according to the embodiment.

FIG. 7A is a diagram showing an example of content registered in a member information DB 12a. FIG. 7B is a diagram showing an example of content registered in a sale item information DB 12b. FIG. 7C is a diagram showing an example of content registered in a moving image DB 12c. FIG. 7D is a diagram showing an example of content registered in a browse history DB 12d. FIG. 7E is a diagram showing an example of content registered in a purchase history DB 12e.

FIG. 10 is a flowchart showing a process example of an edited moving image generation process of the system control unit 14 of the online shopping mall server 1 according to the embodiment.

DESCRIPTION OF EMBODIMENT

Hereinafter, an embodiment of the present invention will be described in detail with reference to the drawings. The embodiment described below is an embodiment where the present invention is applied to an information processing system.

1. Schematic Configuration and Function of Information Processing System

Figure 1:
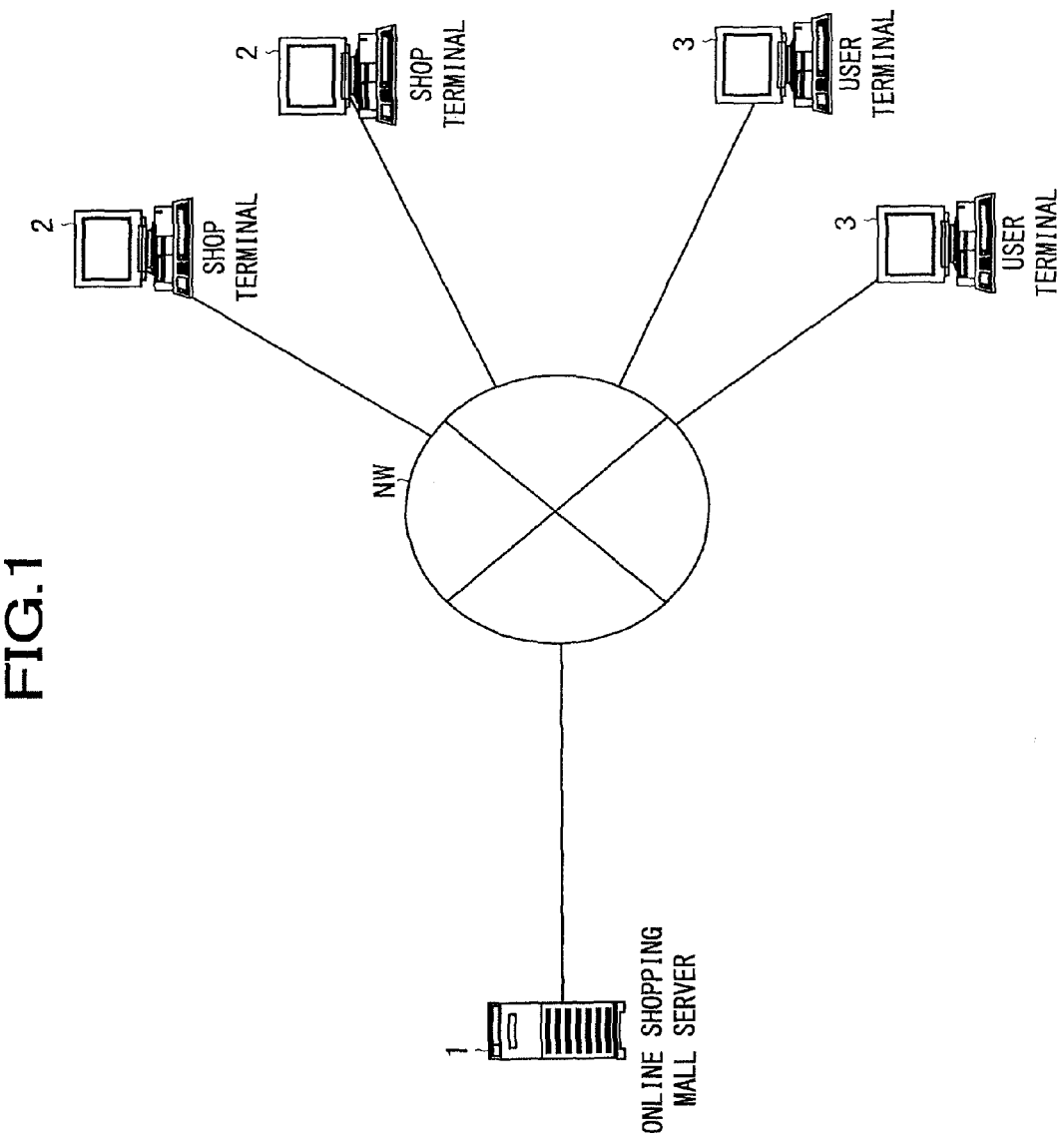
FIG. 1 is a diagram showing an example of a schematic configuration of an information processing system S according to an embodiment.

First, a configuration of an information processing system S according to the embodiment will be described with reference to FIG. 1. FIG. 1 is a diagram showing an example of a schematic configuration of the information processing system S according to the embodiment.

As shown in FIG. 1, the information processing system S includes an online shopping mall server 1, a plurality of shop terminals 2, and a plurality of user terminals 3. The online shopping mall server 1, each shop terminal 2, and each user terminal 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The online shopping mall server 1 is a server device that performs various processes related to an online shopping mall from which items for sale can be purchased. The online shopping mall server 1 is an example of an information processing apparatus of the present invention. A user can purchase a desired item for sale from a desired shop by using the online shopping mall. For example, the online shopping mall server 1 transmits a web page of the online shopping mall and performs processes related to a search and a purchase of an item for sale according to a request from the user terminal 3.

The shop terminal 2 is a terminal device used by a shop that is open in the online shopping mall. The shop terminal 2 accesses a server device such as the online shopping mall server 1 on the basis of an operation from an employee or the like of the shop. Thereby, the shop terminal 2 receives a web page from the server device and displays the web page. In the shop terminal 2, software such as a browser and an email client is installed. For example, an employee registers information of items for sale to be sold in the online shopping mall and checks contents of orders of items for sale by using the shop terminal 2.

The user terminal 3 is a terminal device of a user who uses the online shopping mall. The user terminal 3 receives a web page from the online shopping mall server 1 and displays the web page by accessing the online shopping mall server 1 on the basis of an operation from a user. In the user terminal 3, software such as a browser and an email client is installed. For example, a personal computer, a PDA (Personal Digital Assistant), a mobile information terminal such as a smartphone, and a mobile phone are used as the user terminal 3.

2. Display of Sale Item Page

Next, display of a sale item page suitable for a user who has purchased an item for sale will be described with reference to FIGS. 2 to 5. The sale item page is a web page which is included in the online shopping mall and in which detailed information related to an item for sale is displayed. The sale item page exists for each item for sale sold by the shop. The sale item page is an example of contents of the present invention.

Figure 2:
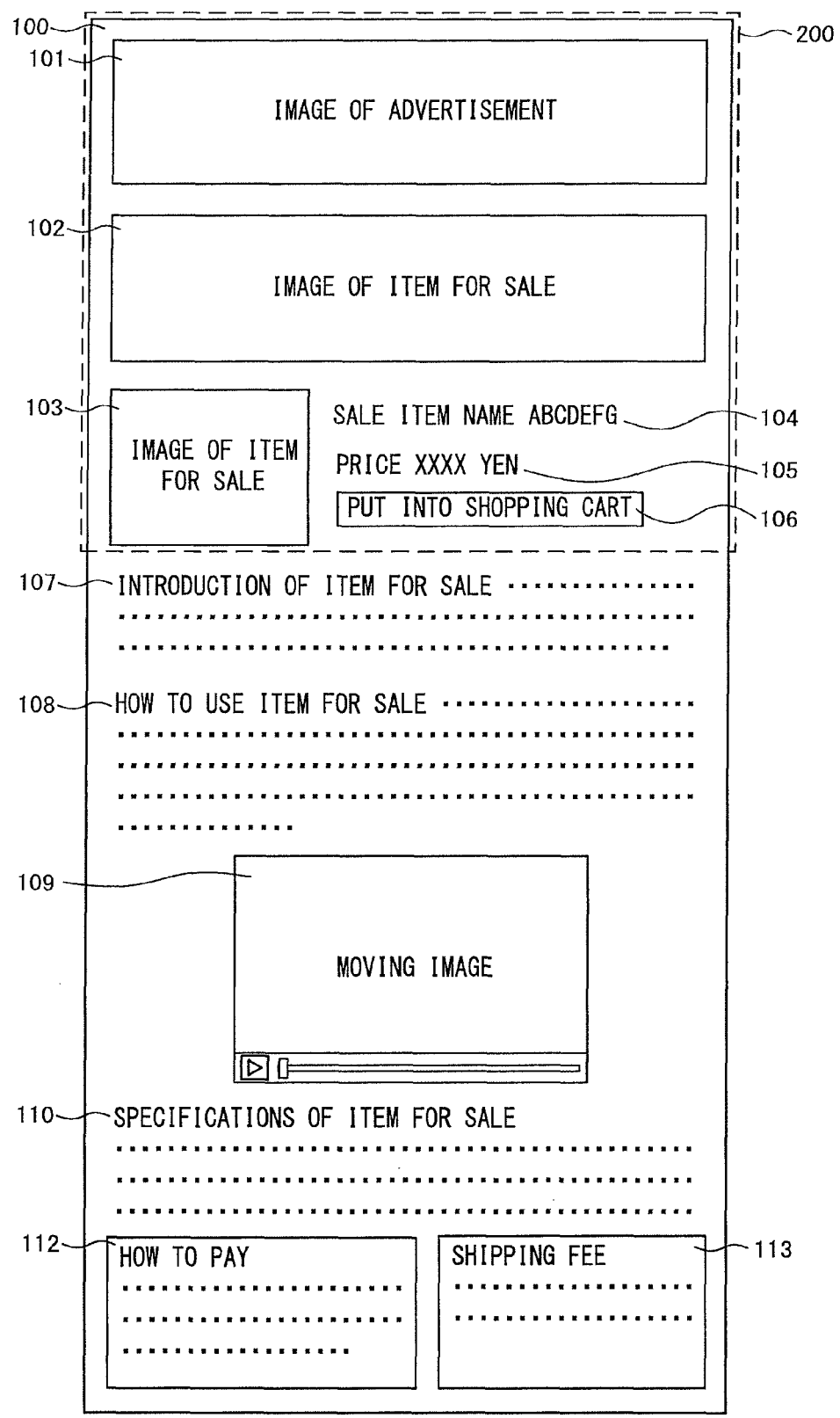
FIG. 2 is a diagram showing an example of a sale item page.

FIG. 2 is a diagram showing an example of the sale item page. The sale item page includes various components. Each component is a part of the sale item page. Examples of the component include information such as an image, characters, a text, and a graph and an operation component. Examples of the operation component include a button and the like. As shown in FIG. 2, a sale item page 100 includes an advertisement image 101, a sale item image 102, a sale item image 103, a sale item name 104, a price 105, a shopping cart registration button 106, an introduction 107, How to use 108, a moving image 109, specifications 110, How to pay 112, and a shipping fee 113. The shopping cart registration button 106 is a button for putting an item for sale into a shopping cart. The shopping cart is a virtual container into which items for sale selected by the user as items to be purchased are put. The user can purchase items for sale from among the items for sale put into the shopping cart. The moving image 109 is a moving image created by the shop. The moving image created by the shop is, for example, a moving image of the item for sale or a moving image of things related to the item for sale. The moving image may include sound.

Components included in all sale item pages are the sale item name 104, the price 105, and the shopping cart registration button 106. The shop can freely determine which components are to be placed on the sale item page in addition to these components. Further, the shop can freely determine a layout of the components in the sale item page. Therefore, contents of a sale item page may be different from those of the sale item page 100 shown in FIG. 2 depending on an item for sale.

The shop generally determines the components to be placed on the sale item page and the layout of the components in order to improve sales of the item for sale. That is to say, it is assumed that the shop basically designs the sale item page for users who have not yet purchased the item for sale. However, users who have purchased the item for sale may browse the sale item page of the item for sale. For example, if information which a user wants to see after purchasing the item for sale is placed on the sale item page, the user may browse the sale item page. In this case, it takes time and effort for the user to find out the information which the user wants to see from the sale item page. The reason of this is that the sale item page includes information that is unnecessary after purchasing the item for sale. For example, if the sale item page is vertically long as shown in FIG. 2, one screen may not be able to display the entire sale item page. In FIG. 2, a display area 200 is an area in which the sale item page is displayed. The user can perform an operation to scroll the sale item page with respect to the display area 200. The display area 200 may be, for example, a client area of a window of a browser or the entire screen of the user terminal 3. The display area 200 is an example of an area of the present invention. In FIG. 2, only the advertisement image 101, the sale item image 102, the sale item image 103, the sale item name 104, the price 105, the shopping cart registration button 106 are displayed. When the user wants to see the How to use 108, the user has to perform the scroll operation.

Therefore, when a user who has purchased an item for sale requests the sale item page of the item for sale, the online shopping mall server 1 causes the user terminal 3 to display the sale item page in a state suitable for after the purchase on the screen. The state suitable for after the purchase is a state in which a part which users who have purchased the item for sale often saw in the sale item page after purchasing the item for sale is preferentially seen. The reason of this is that such a part is highly probably a part which the user who requests the sale item page at this time wants to see.

FIG. 3 is a sequence diagram showing a process example of the information processing system S according to the present embodiment. As shown in FIG. 3, the user terminal 3 transmits a request for a sale item page of an item for sale that is specified by a user to the online shopping mall server 1 (step S1). The user who uses the user terminal 3 that is the transmission source of the request is referred to as a "request user". The item for sale that is specified by the request user is referred to as a "specified sale item". The online shopping mall server 1 which receives the request determines whether or not the request user has purchased the specified sale item (step S2). When a user purchases an item for sale in the online shopping mall, the online shopping mall server 1 registers a purchase history. Therefore, the online shopping mall server 1 can perform the determination on the basis of the presence or absence of the purchase history. If the online shopping mall server 1 determines that the request user has not purchased the specified sale item (step S2: NO), the online shopping mall server 1 transmits the sale item page of the specified sale item to the user terminal 3 without change (step S5). As a result, for example, the sale item page as shown in FIG. 2 is displayed in the display area 200 on the screen of the user terminal 3.

On the other hand, if the online shopping mall server 1 determines that the request user has purchased the specified sale item (step S2: YES), the online shopping mall server 1 identifies a part that has been often seen after the purchase of the specified sale item from the sale item page (step S3). The part that has been often seen may be, for example, a part where the total amount of time in which the part is seen by users who have purchased the specified sale item after the purchase of the specified sale item is longest.

Or, the part that has been often seen may be, for example, a part where the total amount of time in which the part is seen after the purchase exceeds a threshold value determined according to the total amount of browsing time of the web page of the specified sale item. The online shopping mall server 1 records a browse history of the sale item page. The browse history includes browse information. The browse information indicates which part of the sale item page is browsed. Therefore, the online shopping mall server 1 identifies the part that has been often seen after the purchase on the basis of the browse information. The online shopping mall server 1 may identify only one part that has been often seen after the purchase or may identify a plurality of parts that have been often seen after the purchase.

Next, the online shopping mall server 1 generates the sale item page so that the sale item page is displayed on the screen of the user terminal 3 in a state in which the identified part is seen more preferentially than when the online shopping mall server 1 determines that the request user has not purchased the specified sale item (step S4). The state in which the identified part is seen preferentially is, for example, a state in which the identified part is included in the display area 200 when the sale item page is displayed in the display area 200. Or, the state in which the identified part is seen preferentially may be, for example, a state in which an operation to display the identified part (for example, a scroll operation) requires less time and effort than an operation to display other parts. Then, the online shopping mall server 1 transmits the generated sale item page (step S5). The user terminal 3 receives the sale item page transmitted from the online shopping mall server 1 and displays the sale item page (step S6).

Figure 4A:
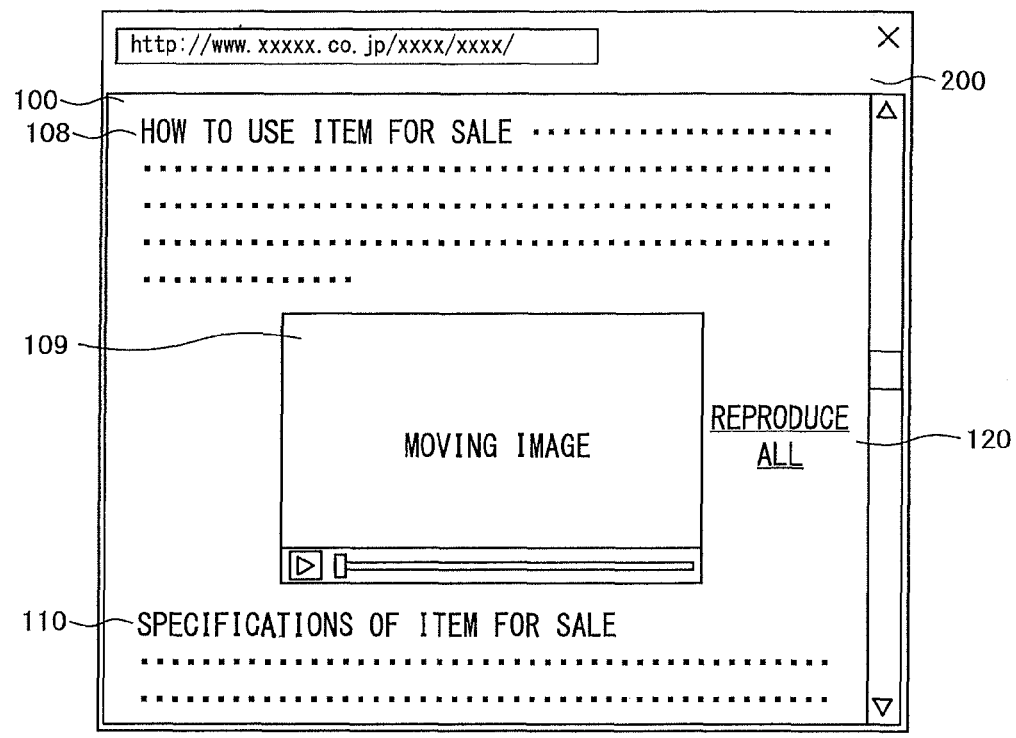
FIGS. 4A and 4B are display examples of a sale item page in the case in which a sale item page is displayed in a state in which a part that has been often seen after purchase is preferentially seen.
Figure 4B:
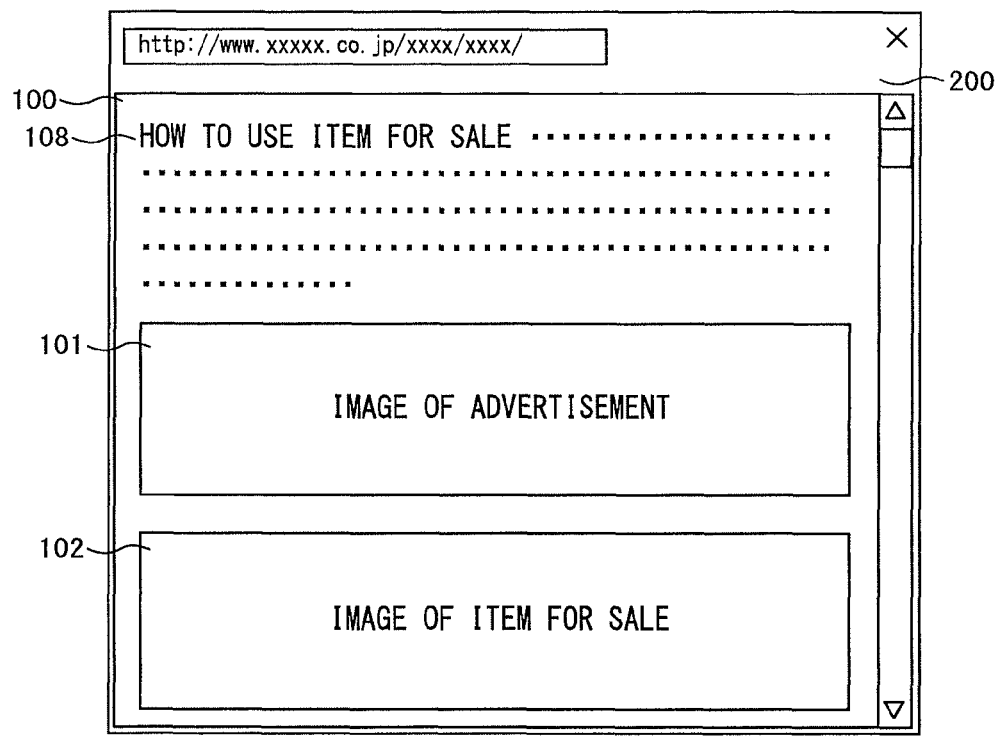

FIGS. 4A and 4B are display examples of the sale item page in the case in which the sale item page is displayed in the state in which the part that has been often seen after the purchase is preferentially seen. For example, in the sale item page 100 shown in FIG. 2, the How to use 108 is a part that has been often seen after the purchase. For example, as shown in FIG. 4A, the online shopping mall server 1 may control the display position of the sale item page 100 so that the How to use 108 is included in the display area 200. Thereby, the user need not perform a scroll operation. At this time, it is preferable that the online shopping mall server 1 performs control so that the How to use 108 is located in the upper part of the display area 200. Or, the online shopping mall server 1 may arrange a component that has been often seen at a position that is seen more easily than other components. The position that is seen easily may be the uppermost position of the sale item page. For example, as shown in FIG. 4B, the online shopping mall server 1 converts the sale item page 100 so that the How to use 108 is positioned at the uppermost position of the sale item page 100. Thereby, the How to use 108 is included in the display area 200. Also in this case, the user need not perform a scroll operation. When comparing FIG. 2 with FIGS. 4A and 4B, if the online shopping mall server 1 determines that the request user has purchased the specified sale item, the part that has been often seen after the purchase is displayed more preferentially than when the online shopping mall server 1 determines that the request user has not purchased the specified sale item.

After displaying the sale item page, the user terminal 3 transmits the browse information to the online shopping mall server 1 at a predetermined timing (step S7). The online shopping mall server 1 that receives the browse information records the browse information in the browse history (step S8).

A user may view a moving image by reproducing the moving image included in the sale item page. An operation component group for controlling reproduction of the moving image is displayed on the sale item page along with the moving image. The operation component group includes a button for reproduction and pause and a seek bar. The seek bar has a role as an indicator that indicates a reproduction position, on the time axis, of the moving image and a role as a slide bar to change the reproduction position. The operation component group may include, for example, a button for rewinding reproduction, a button for fast feeding reproduction, and a button for slow reproduction.

The moving image may include a portion (for example, a scene) which the user wants to see after the purchase of the item for sale. However, the moving image may include a portion which is unnecessary after the purchase of the item for sale. Therefore, it may take time from when the reproduction of the moving image is started to when the portion which the user wants to see is reproduced. Further, there is a case in which the user has to perform a seek operation to search for the portion which the user wants to see. Therefore, when a user who has purchased an item for sale requests the sale item page of the item for sale, the online shopping mall server 1 causes the user terminal 3 to display the sale item page which includes a moving image suitable after the purchase of the item for sale. Thereby, the online shopping mall server 1 causes the user terminal 3 to reproduce the moving image suitable after the purchase of the item for sale. Here, the moving image created by a shop is referred to as an "original moving image". On the other hand, the moving image generated by the online shopping mall server 1 to be suitable after the purchase of the item for sale is referred to as an "edited moving image".

As shown in FIG. 3, when the request user performs an reproduction operation of the moving image (step S9), the online shopping mall server 1 transmits the moving image of the specified sale item to the user terminal 3 by, for example, streaming (step S10). The user terminal 3 reproduces the moving image of the specified sale item (step S11). The user terminal 3 transmits reproduction information to the online shopping mall server 1 at a predetermined timing (step S12). The reproduction information indicates which portion of the moving image is reproduced. The online shopping mall server 1 that receives the reproduction information records the reproduction information in the browse history (step S13).

When a predetermined condition related to the moving image of the specified sale item is satisfied, the online shopping mall server 1 generates the edited moving image. Specifically, the online shopping mall server 1 identifies the part that has been often seen after the purchase of the specified sale item from the moving image of the specified sale item on the basis of the reproduction information (step S14). The part that has been often seen may be, for example, a part where the number of reproduction times by users who have purchased the specified sale item after the purchase of the specified sale item is greatest. Or, the part that has been often seen may be, for example, a part where the number of reproduction times after the purchase exceeds a threshold value determined according to the total amount of reproduction time of the moving image. The online shopping mall server 1 may identify only one part that has been often seen after the purchase or may identify a plurality of parts that have been often seen after the purchase.

Next, the online shopping mall server 1 generates the edited moving image so that the edited moving image is reproduced in a state in which the identified part is reproduced more preferentially than when the request user has not purchased the specified sale item (step S15). The state in which the identified part is reproduced preferentially is, for example, a state in which only the identified part is reproduced. Or, the state in which the identified part is reproduced preferentially is, for example, a state in which the identified part is reproduced earlier than other parts. Or, the state in which the identified part is reproduced preferentially may be, for example, a state in which an operation to reproduce the identified part (for example, an operation of a reproduction button or the seek bar) requires less time and effort than an operation to reproduce other parts. The online shopping mall server 1 generates the sale item page in step S5 so that the generated edited moving image is reproduced.

Figure 5A:
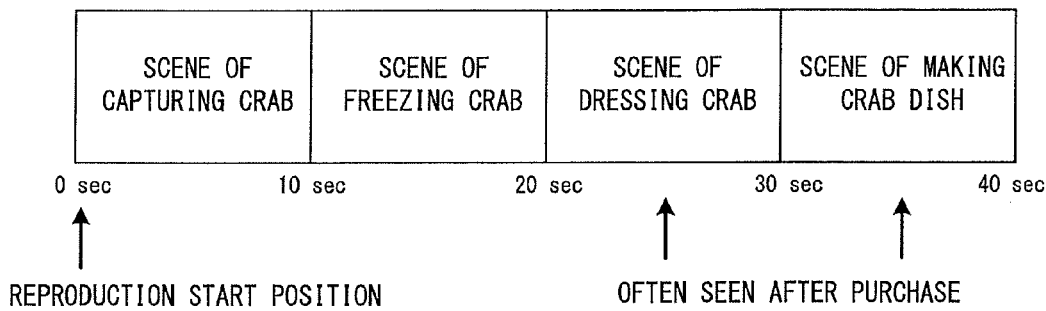
FIG. 5A is an example of allocation of scenes of an original moving image.
Figure 5B:
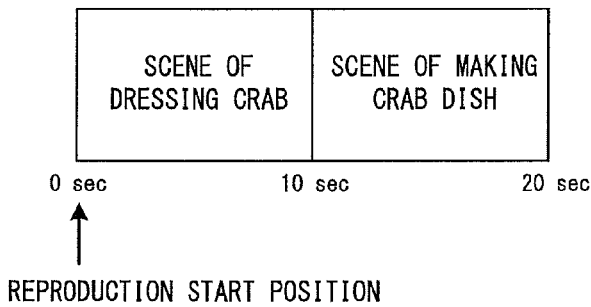
FIG. 5B is an example of allocation of scenes of an edited moving image.

FIG. 5A is an example of allocation of scenes of the original moving image. FIG. 5B is an example of allocation of scenes of the edited moving image. For example, the item for same is a crab. As shown in FIG. 5A, for example, in the original moving image of the crab, a scene of capturing the crab is reproduced between the reproduction positions of 0 and 10 seconds, a scene of freezing the crab is reproduced between 10 and 20 seconds, a scene of dressing the crab is reproduced between 20 and 30 seconds, and a scene of making a crab dish is reproduced between 30 and 40 seconds. A scene that has been often seen after the purchase of the crab among these scenes is the scene of dressing the crab and the scene of making a crab dish. In this case, for example, as shown in FIG. 5B, the online shopping mall server 1 generates an edited moving image including only the scene of dressing the crab and the scene of making a crab dish. Thereby, necessary scenes are quickly reproduced.

However, the user who has purchased the item for sale may want to seethe original moving image. This case is, for example, a case in which a part required by the user is not included in the edited moving image. Therefore, for example, as shown in FIG. 4A, the online shopping mall server 1 may embed a link 120 to reproduce the original moving image in the sale item page. Further, for example, the online shopping mall server 1 may generate the edited moving image so that the scene of dressing the crab and the scene of making a crab dish are reproduced between 0 and 20 seconds, and the scene of capturing the crab and the scene of freezing the crab are reproduced between 20 and 40 seconds.

Figure 5C:
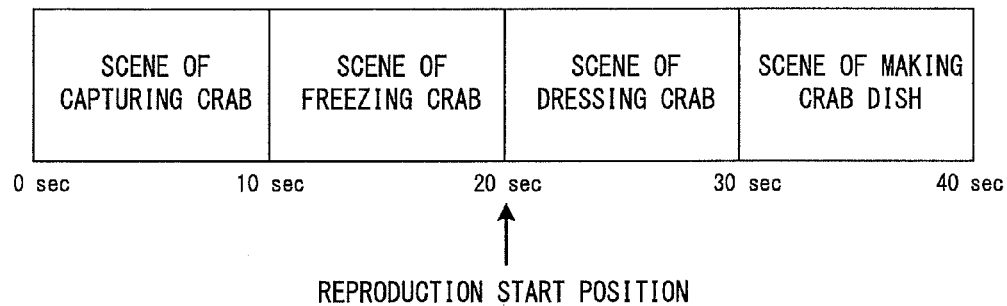
FIG. 5C is a diagram showing an example of a change of a reproduction start position of a moving image.

Further, for example, the online shopping mall server 1 may change the reproduction start position of the moving image instead of generating the edited moving image. The initial value of the reproduction start position is 0 second. FIG. 5C is a diagram showing an example of a change of the reproduction start position of the moving image. For example, the online shopping mall server 1 changes the reproduction start position from 0 second to 20 seconds. Thereby, the necessary scenes are quickly reproduced and all the scenes can be reproduced by a seek operation of the user.

When comparing FIG. 5A with FIGS. 5B and 5C, if the request user has purchased the specified sale item, the part that has been often seen after the purchase is reproduced more preferentially than when the request user has not purchased the specified sale item.

3. Configuration of Online Shopping Mall Server

Next, a configuration of the online shopping mall server 1 will be described with reference to FIGS. 6 to 8.

Figure 6:
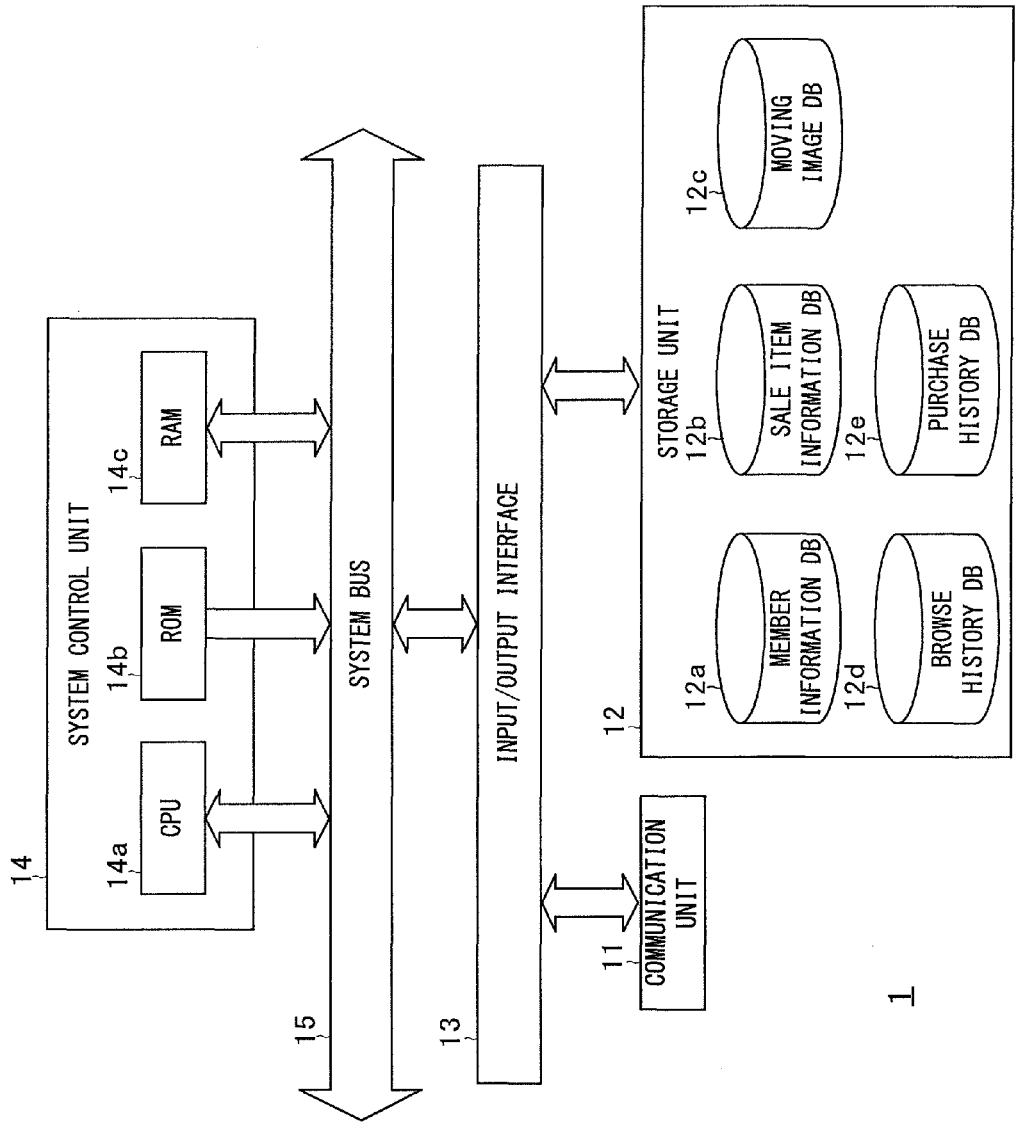
FIG. 6 is a block diagram showing an example of a schematic configuration of an online shopping mall server 1 according to the embodiment.

FIG. 6 is a block diagram showing an example of a schematic configuration of the online shopping mall server 1 according to the present embodiment. As shown in FIG. 6, the online shopping mall server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the shop terminal 2 and the user terminal 3.

The storage unit 12 includes, for example, a hard disk drive and the like. In the storage unit 12, databases such as a member information DB 12*a*, a sale item information DB 12*b*, a moving image DB 12*c*, a browse history DB 12*d*, and a purchase history DB 12*e* are constructed. The "DB" is an abbreviation of database.

FIG. 7A is a diagram showing an example of content registered in the member information DB 12*a*. In the member information DB 12*a*, member information related to users registered in the online shopping mall as a member is registered. Specifically, in the member information DB 12*a*, user attributes such as a user ID, a password, a nickname, a name, a date of birth, a gender, a postal code, an address, a phone number, and an email address are registered in association with each other for each user.

FIG. 7B is a diagram showing an example of content registered in the sale item information DB 12*b*. In the sale item information DB 12*b*, sale item information related to the items for sale sold in the online shopping mall is registered. The sale item information is information registered by a shop. Specifically, in the sale item information DB 12*b*, a shop ID, a sale item ID, a category ID, a sale item name, a sale item image, detail information, a sale item price, a moving image ID of the original moving image, a moving image ID of the edited moving image, and the like are registered in association with each other for each item for sale sold by a shop. The shop ID is identification information of the shop which sells the item for sale. The item for sale ID is identification information of item for sale for the shop to manage the item for sale sold by the shop. A combination of the shop ID and the sale item ID corresponds to the sale item page on one-on-one basis. The category ID indicates a category to which the item for sale belongs. The detail information is detailed information related to the item for sale. The shop can register various information as the detail information. The moving image ID is identification information of the moving image. Each of the moving image ID of the original moving image and the moving image ID of the edited moving image is registered as needed.

FIG. 7C is a diagram showing an example of content registered in the moving image DB 12*c*. In the moving image DB 12*c*, a moving image is registered. Specifically, in the moving image DB 12*c*, the moving image ID, registration date and time, and data of the moving image are registered in association with each other. The registration date and time is the date and time at which the moving image is registered.

FIG. 7D is a diagram showing an example of content registered in the browse history DB 12*d*. In the browse history DB 12*d*, the browse histories of the sale item pages are registered. The browse history is an example of a history of the present invention. Specifically, in the browse history DB 12*d*, a user ID, a shop ID, a sale item ID, display date and time, and a purchase state are registered. The user ID indicates a user who browsed the sale item page. The shop ID and the sale item ID indicate the item for sale corresponding to the browsed sale item page. The display date and time indicates the time and date when the sale item page is displayed. The actual display date and time is a date and time when the system control unit 14 transmits an HTML (HyperText Markup Language) document of the sale item page. The purchase state indicates whether or not the user indicated by the user ID has purchased an item for sale indicated by the shop ID and the sale item ID. The purchase state is set to either one of "not purchased" and "after purchase".

Further, in the browse history DB 12*d*, one or more pieces of browse information and one or more pieces of reproduction information are registered as needed for each combination of the user ID, the shop ID, the sale item ID, and the display date and time. The browse information includes browsed part information and browsing time. The browsed part information indicates a part displayed in the display area 200. For example, the browsed part information may be identification information of a component included in a range displayed in the display area 200, in the sale item page. The identification information of the component may be, for example, a name attribute or an id attribute of an HTML tag corresponding to the component. The browsed part information may be coordinates, on the sale item page, of the range displayed in the display area 200. The browsed part information when the purchase state is the "after purchase" is an example of information indicating a displayed part of the web page of the item for sale after the purchase of the item for sale. The browsed part information when the purchase state is the "not purchased" is an example of information indicating a browsed part of the web page of the item for sale when the item for sale has not been purchased. The browsing time indicates a duration for which the part indicated by the browsed part information had been displayed. The reproduction information includes a moving image ID and reproduced part information. The moving image ID indicates a reproduced moving image. The reproduced part information indicates a range, on the time axis, in which the moving image is reproduced. The reproduced part information when the purchase state is the "after purchase" is an example of information indicating a reproduced part (displayed part) of the moving image after the purchase of the item for sale.

FIG. 7E is a diagram showing an example of content registered in the purchase history DB 12*e*. In the purchase history DB 12*e*, purchase histories of items for sale by users are registered. Specifically, in the purchase history DB 12*e*, an order code, a purchase date and time, a user ID, a shop ID, a sale item ID, and the like are registered in association with each other for each purchase of item for sale. The order code is identification information of an order given each time an item for sale is ordered. The user ID indicates a purchaser. The shop ID and the sale item ID indicate a purchased item for sale.

The online shopping mall server 1 can evaluate a moving image on the basis of the purchase history and the browse history when the item for sale is not purchased. For example, the online shopping mall server 1 can calculate a ratio of users who purchased the item for sale after seeing the moving image as well as identify a part, from the entire moving image, which a user who purchased the item for sale saw before the purchase. For example, the online shopping mall server 1 transmits information indicating an evaluation result of the moving image of an item for sale that is specified by a shop to the shop terminal 2 according to a request from the shop terminal 2. For example, the shop can recreate the moving image based on the evaluation of the moving image. Thereby, the shop can utilize the moving image for promoting sales. It is assumed that the browse history after the purchase of the item for sale is not appropriate for such use. The reason of this is that the probability that a user who purchased an item for sale purchases the same item for sale after the purchase is low.

Next, other information stored in the storage unit 12 will be described. The storage unit 12 stores various data, which is for displaying web pages, such as HTML documents, XML (Extensible Markup Language) documents, image data, text data, and electronic documents. The storage unit 12 also stores various setting values. When the system control unit 14 registers the sale item information transmitted from the shop terminal 2 in the sale item information DB 12*b*, the system control unit 14 generates a sale item page based on the sale item information and causes the storage unit 12 to store the sale item page. The storage unit 12 also stores various setting values.

Further, the storage unit 12 stores various programs such as an operating system, a WWW (World Wide Web) server program, a DBMS (Database Management System), and an electronic commerce management program. The electronic commerce management program is a program for performing various processes related to the electronic commerce. The electronic commerce management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

Figure 8:
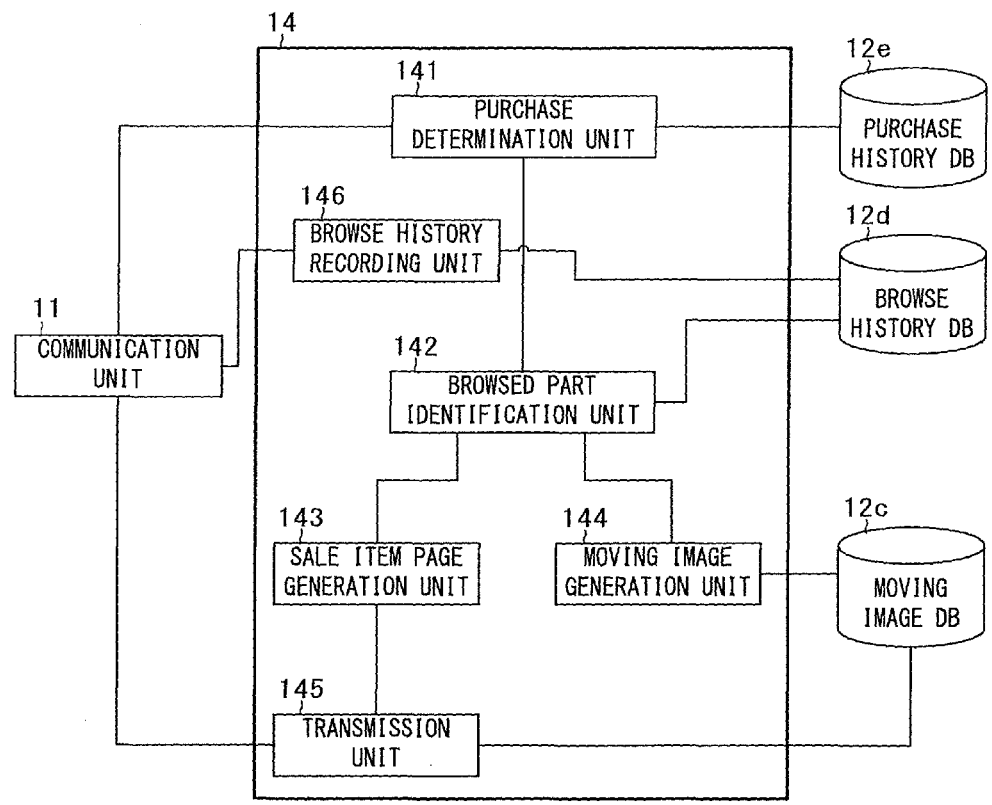
FIG. 8 is a diagram showing an example of functional blocks of the online shopping mall server 1 according to the embodiment.

FIG. 8 is a block diagram showing an example of functional blocks of the online shopping mall server 1 according to the present embodiment. The system control unit 14 includes a CPU 14*a*, a ROM (Read Only Memory) 14*b*, a RAM (Random Access Memory) 14*c*, and the like. In the system control unit 14, the CPU 14*a* reads and executes various programs, so that the system control unit 14 functions as a purchase determination unit 141, a browsed part identification unit 142, a sale item page generation unit 143, a moving image generation unit 144, a transmission unit 145, and a browse history recording unit 146 as shown in FIG. 8. The purchase determination unit 141 is an example of a determination means of the present invention. The browsed part identification unit 142 is an example of an identification means of the present invention. The sale item page generation unit 143, the moving image generation unit 144, and the transmission unit 145 are an example of a control means of the present invention.

The purchase determination unit 141 determines whether or not the request user has purchased the specified sale item on the basis of the purchase history registered in the purchase history DB 12*e* when receiving a request for the sale item page from the user terminal 3. The browsed part identification unit 142 identifies a part that has been often seen after the purchase of the specified sale item from the sale item page of the specified sale item on the basis of the browse information of the browse history registered in the browse history DB 12*d*. Further, the browsed part identification unit 142 identifies a part that has been often seen after the purchase of the specified sale item from the moving image of the specified sale item on the basis of the reproduction information of the browse history registered in the browse history DB 12*d*. The sale item page generation unit 143 generates an HTML document of the sale item page so that the sale item page is displayed in a state in which the part identified by the browsed part identification unit 142 is preferentially seen. The moving image generation unit 144 generates an edited moving image so that the edited moving image is reproduced in a state in which the part identified by the browsed part identification unit 142 is preferentially reproduced. The transmission unit 145 transmits information such as an HTML document and a moving image to the user terminal 3 through the communication unit 11. The browse history recording unit 146 registers the browse history in the browse history DB 12*d* on the basis of the browse information and the reproduction information transmitted from the user terminal 3.

The online shopping mall server 1 may include a plurality of server devices. For example, a server device that performs processing such as searching for an item for sale and ordering an item for sale in the online shopping mall, a server device that identifies a part that has been often seen after the purchase of the item for sale from the sale item page and the moving image and generates a sale item page and an edited moving image, a server device that transmits a web page according to a request from the user terminal 3, a server device that manages databases, and the like may be connected to each other by a LAN or the like.

4. Operation of Information Processing System

Next, an operation of the information processing system S will be described with reference to FIGS. 9 and 10. The operation example described below is an example of a case in which the online shopping mall server 1 causes the user terminal 3 to display a sale item page so that a part that has been often seen after the purchase is included in the display area 200 as shown in FIG. 4A. Further, the operation example described below is an example of a case in which the online shopping mall server 1 generates an edited moving image as shown in FIG. 5B.

Figure 9:
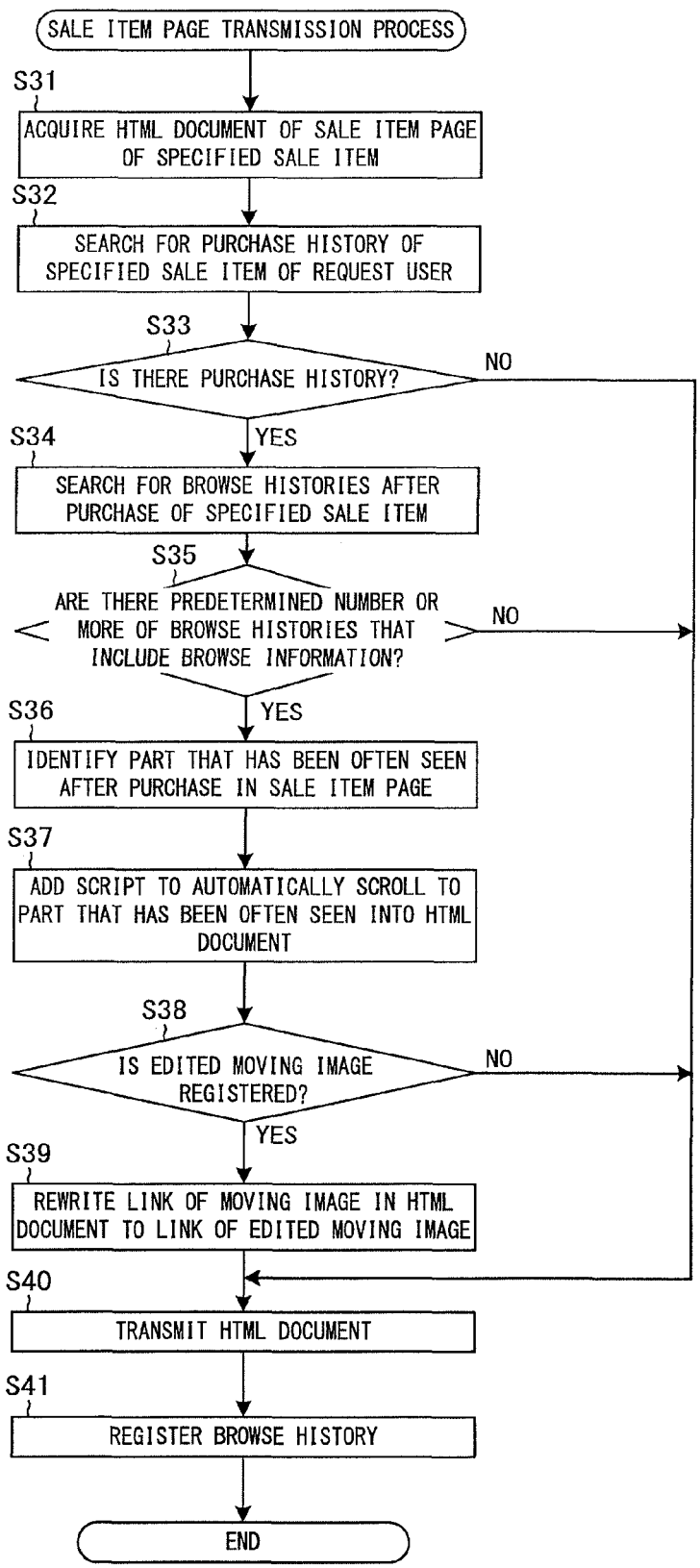
FIG. 9 is a flowchart showing a process example of a sale item page transmission process of a system control unit 14 of the online shopping mall server 1 according to the embodiment.

FIG. 9 is a flowchart showing a process example of a sale item page transmission process of the system control unit 14 of the online shopping mall server 1 according to the present embodiment. The sale item page transmission process is preformed every time the online shopping mall server 1 receives a request for a sale item page from the user terminal 3. The request for a sale item page includes a URL of an HTML document of the sale item page of the specified sale item and the user ID of the request user.

As shown in FIG. 9, the sale item page generation unit 143 acquires the HTML document of the sale item page of the specified sale item from the storage unit 12 (step S31). At this time, the sale item page generation unit 143 acquires the current date and time as the display date and time. Then, the system control unit 14 adds the display date and time into the acquired HTML document.

Next, the purchase determination unit 141 searches the browse history DB 12*d* for a purchase history indicating that the request user has purchased the specified sale item (step S32). Specifically, the purchase determination unit 141 searches for a purchase history including the user ID of the request user and the shop ID and the sale item ID of the specified sale item. Next, the purchase determination unit 141 determines whether or not there is a purchase history matching (step S33). At this time, if the purchase determination unit 141 determines that there is no purchase history matching (step S33: NO), the purchase determination unit 141 proceeds to step S40. On the other hand, if the purchase determination unit 141 determines that there is the purchase history matching (step S33: YES), the purchase determination unit 141 proceeds to step S34. In step S40, the transmission unit 145 transmits the acquired HTML document to the user terminal 3. Next, the transmission unit 145 proceeds to step S41.

In step S34, the browsed part identification unit 142 searches the browse history DB 12*d* for browse histories after the purchase of the specified sale item. Specifically, the browsed part identification unit 142 searches for browse histories where the purchase state is the "after purchase" from among the browse histories including the shop ID and the sale item ID of the specified sale item. The browse histories to be searched for include a browse history of the request user and browse histories of users other than the request user. The browsed part identification unit 142 may perform the search only from among the browse histories registered in a predetermined period of time.

Next, the browsed part identification unit 142 determines whether or not there are a predetermined number or more of browse histories that include the browse information in the found browse histories (step S35). At this time, if the browsed part identification unit 142 determines that there are the predetermined number or more of browse histories that include the browse information (step S35: YES), the browsed part identification unit 142 proceeds to step S36. On the other hand, if the browsed part identification unit 142 determines that there are not the predetermined number or more of browse histories that include the browse information (step S35: NO), the browsed part identification unit 142 proceeds to step S40.

In step S36, the browsed part identification unit 142 identifies a part that has been most often seen in the sale item page of the specified sale item on the basis of the browse information included in the found browse histories. For example, the browsed part identification unit 142 calculates the total amount of browsing time for each part in the sale item page on the basis of the browsed part information and the browsing time. Then, the browsed part identification unit 142 identifies a part where the total amount of browsing time is greatest as the part that has been most often seen. The browsed part identification unit 142 need not identify a component whose content is the same in all sale item pages as the part that has been most often seen. The component whose content is the same in all sale item pages is, for example, a shopping cart registration button. Further, for example, a trademark of the online shopping mall, a notice of copyright, a navigation area, and the like may be displayed in all sale item pages. The navigation area is, for example, an area in which a plurality of links to specific web pages is displayed or an area in which an input field and a button to specify a search condition of an item for sale are displayed.

Next, the sale item page generation unit 143 adds a script to cause a part that has been often seen after the purchase to be included in the display area 200 to the acquired HTML document (step S37). For example, the script is to automatically scroll the sale item page to the part that has been most often seen when the sale item page is completely displayed (when an onload event occurs).

Next, the sale item page generation unit 143 determines whether or not the edited moving image of the specified sale item is registered (step S38). When the moving image ID of the edited moving image is included in the sale item information of the specified sale item, the edited moving image is registered. If the sale item page generation unit 143 determines that the edited moving image is not registered (step S38: NO), the sale item page generation unit 143 proceeds to step S40. Here, the transmission unit 145 transmits the HTML document into which the script is added. On the other hand, if the sale item page generation unit 143 determines that the edited moving image is registered (step S38: YES), the sale item page generation unit 143 proceeds to step S39.

In step S39, the sale item page generation unit 143 rewrites a URL of the original moving image described in the HTML document, into which the script is added, into a URL of the edited moving image. The sale item page generation unit 143 can generate the URL based on the moving image ID of the edited moving image. Further, the sale item page generation unit 143 adds a link 120 to reproduce the original moving image to the HTML document. Next, in step S40, the transmission unit 145 transmits the HTML document in which the URL of the moving image is rewritten to the user terminal 3.

In step S41, the browse history recording unit 146 registers the browse history in the browse history DB 12*d* (step S41). Specifically, the browse history recording unit 146 registers the user ID of the request user, the shop ID of the specified sale item, the sale item ID of the specified sale item, the display date and time, and the purchase state in association with each other. At this time, if it is determined that there is no purchase history matching in step S33, the browse history recording unit 146 sets the purchase state to "not purchased". On the other hand, if it is determined that there is a purchase history matching, the browse history recording unit 146 sets the purchase state to "after purchase". After completing this process, the browse history recording unit 146 ends the sale item page transmission process.

The user terminal 3 that receives the HTML document displays the sale item page in the display area 200 on the basis of the HTML document. At this time, if the request user has purchased the specified sale item and a certain number of browse histories are accumulated, the user terminal 3 executes the script when the display of the sale item page is completed. Thereby, for example, the sale item page is displayed as shown in FIG. 4A.

The system control unit 14 may use a method other than the method in which the script is added. For example, the system control unit 14 may use an HTTP (HyperText Transfer Protocol) redirect. Specifically, the sale item page generation unit 143 adds identification information of a component located in the part that has been most often seen to the URL of the HTML document of the sale item page of the specified sale item. Then, the transmission unit 145 transmits the URL to which the identification information is added to the user terminal 3. Processing content after that to when the user terminal 3 displays the sale item page is known, so that the detailed description will be omitted.

When changing the arrangement of components as shown in FIG. 4B, the sale item page generation unit 143 rewrites the HTML document of the sale item page acquired from the storage unit 12 so that the component that has been most often seen is located at an uppermost portion of the sale item page. At this time, the sale item page generation unit 143 may rearrange components, for example, in descending order of the total amount of browsing time. There is a case in which components, whose content is the same in all sale item pages, such as the trademark of the online shopping mall and the navigation area, are arranged at the uppermost portion of the sale item page from the beginning. In this case, the sale item page generation unit 143 may place the component that has been often seen below the components whose content is the same in all sale item pages.

When the user terminal 3 displays the sale item page, the user terminal 3 transmits the browse information to the online shopping mall server 1, for example, every time the user performs an operation related to the sale item page. Examples of the operation related to the sale item page include an operation to scroll the sale item page and an operation to select a link and a button such as the shopping cart registration button 106. Further, for example, the user terminal 3 periodically transmits the browse information while there is no operation from user. The browsed part information set in the browse information is, for example, identification information of a component located in a range, in the sale item page, displayed in the display area 200 when the browse information is transmitted. The browsing time is, for example, the time elapsed from when the previous browse information is transmitted. The user terminal 3 transmits the browse information along with the user ID of the request user, the shop ID and the sale item ID of the specified sale item, and the display date and time included in the HTML document. The browse history recording unit 146 registers the received browse information in the browse history DB 12d in association with the user ID, the shop ID, the sale item ID, and the display date and time which are transmitted along with the browse information.

When the request user performs an operation to reproduce a moving image, the user terminal 3 starts reproduction of either one of the original moving image and the edited moving image. For example, the user terminal 3 transmits the reproduction information to the online shopping mall server 1 every time the request user performs an operation to control the reproduction of the moving image. At this time, the user terminal 3 transmits the reproduction information along with the user ID of the request user, the shop ID and the sale item ID of the specified sale item, and the display date and time. The browse history recording unit 146 registers the received reproduction information in the browse history DB 12d in association with the user ID, the shop ID, the sale item ID, and the display date and time which are transmitted along with the reproduction information.

FIG. 10 is a flowchart showing a process example of an edited moving image generation process of the system control unit 14 of the online shopping mall server 1 according to the present embodiment. For example, the edited moving image generation process is periodically performed. For example, the edited moving image generation process is performed for each item for sale whose original moving image is registered. Here, an item for sale for which the edited moving image is generated is referred to as an "object sale item".

As shown in FIG. 10, the moving image generation unit 144 determines whether or not the edited moving image of the object sale item is registered (step S61). At this time, if the moving image generation unit 144 determines that the edited moving image is not registered (step S61: NO), the moving image generation unit 144 proceeds to step S62. On the other hand, if the moving image generation unit 144 determines that the edited moving image is registered (step S61: YES), the moving image generation unit 144 proceeds to step S67.

In step S62, the browsed part identification unit 142 searches the browse history DB 12d for browse histories after the purchase of the object sale item. Next, the browsed part identification unit 142 determines whether or not there are a predetermined number or more of browse histories that include the reproduction information in the found browse histories (step S63). At this time, if the browsed part identification unit 142 determines that there are the predetermined number or more of browse histories that include the reproduction information (step S63: YES), the browsed part identification unit 142 proceeds to step S64. On the other hand, if the browsed part identification unit 142 determines that there are not the predetermined number or more of browse histories that include the reproduction information (step S63: NO), the browsed part identification unit 142 ends the edited moving image generation process.

In step S64, the browsed part identification unit 142 identifies a part that has been often seen in the original moving image on the basis of the reproduction information included in the found browse histories. As an identification method of the part that has been often seen, various known methods can be applied. For example, the browsed part identification unit 142 may calculate an evaluation value for each reproduction position. Specifically, for example, the browsed part identification unit 142 calculates the number of reproduction times for each reproduction position. At this time, the browsed part identification unit 142 may consider the rewinding reproduction, the fast feeding reproduction, and the slow reproduction. For example, in the case of the rewinding reproduction and the fast feeding reproduction, the browsed part identification unit 142 adds a value smaller than one to the number of reproduction times. On the other hand, in the case of the slow reproduction, the browsed part identification unit 142 adds a value greater than one to the number of reproduction times. In this case, it is necessary that a type of reproduction is set in the reproduction information. For example, the browsed part identification unit 142 calculates the evaluation value by dividing the number of reproduction times for each reproduction position by the total number of reproduction times of the original moving image. Next, the browsed part identification unit 142 determines the part that has been often seen on the basis of the evaluation values. For example, the browsed part identification unit 142 may determine a part corresponding to a reproduction position whose evaluation value is greater than or equal to a predetermined threshold value as the part that has been often seen.

Next, the moving image generation unit 144 generates an edited moving image including parts that have been often seen in the original moving image (step S65). At this time, the moving image generation unit 144 may detect each reproduction position at which a scene changes by analyzing the original moving image. The moving image generation unit 144 may extract parts that have been often seen in units of scene from the original moving image and generate an edited moving image by using the extracted parts.

Next, the moving image generation unit 144 registers the edited moving image in the moving image DB 12c (step S66). Specifically, the moving image generation unit 144 generates a new moving image ID. At this time, the system control unit 14 registers the current date and time as the registration date and time. Then, the moving image generation unit 144 registers the moving image ID, the registration date and time, and the edited moving image in association with each other. Further, the moving image generation unit 144 stores the moving image ID of the edited moving image in the sale item information of the object sale item. After completing this process, the moving image generation unit 144 ends the edited moving image generation process.

In step S67, the browsed part identification unit 142 searches the browse histories after the purchase of the object sale item for browse histories after the registration of the edited moving image. The browse histories after the registration of the edited moving image are browse histories where the display date and time is later than the registration date and time of the edited moving image. Next, the browsed part identification unit 142 determines whether or not there are a predetermined number or more of browse histories that include the reproduction information of the original moving image in the found browse histories (step S68). At this time, if the browsed part identification unit 142 determines that there are the predetermined number or more of browse histories that include the reproduction information of the original moving image (step S68: YES), the browsed part identification unit 142 proceeds to step S69. On the other hand, if the browsed part identification unit 142 determines that there are not the predetermined number or more of browse histories that include the reproduction information of the original moving image (step S68: NO), the browsed part identification unit 142 ends the edited moving image generation process. Once the edited moving image is registered, the reproduction information of the edited moving image is started to be transmitted from the user terminal 3. However, the edited moving image does not include part of the original moving image. Therefore, it may not be appropriate that the part that has been often seen is identified based on the reproduction information of the edited moving image. Therefore, the moving image generation unit 144 generates an edited moving image on the basis of the reproduction information of the original moving image reproduced when the link 120 shown in FIG. 4A is selected.

In step S69, the browsed part identification unit 142 calculates a ratio of the number of reproduction times of the original moving image to the total number of reproduction times of moving image after the registration of the edited moving image on the basis of the reproduction information included in the found browse histories. Then, the browsed part identification unit 142 determines whether or not the ratio of the number of reproduction times of the original moving image is greater than or equal to a predetermined threshold value. At this time, if the browsed part identification unit 142 determines that the ratio of the number of reproduction times of the original moving image is greater than or equal to the predetermined threshold value (step S69: YES), the browsed part identification unit 142 proceeds to step S70. On the other hand, if the browsed part identification unit 142 determines that the ratio of the number of reproduction times of the original moving image is not greater than or equal to the predetermined threshold value (step S69: NO), the browsed part identification unit 142 ends the edited moving image generation process. When a user reproduces the edited moving image, if a part required by the user is reproduced, the user need not reproduce the original moving image by selecting the link 120. Therefore, the smaller the ratio of the number of reproduction times of the original moving image is, the more appropriate the edited moving image is for the user after the purchase of the object sale item. On the other hand, when the ratio of the number of reproduction times of the original moving image is large to some extent, there is a probability that the edited moving image has to be regenerated.

In step S70, the browsed part identification unit 142 identifies a part that has been often seen in the original moving image on the basis of the reproduction information of the original moving image in the reproduction information included in the found browse histories. At this time, the browsed part identification unit 142 identifies the part that has been often seen while excluding parts included in the edited moving image that is currently registered.

Next, the moving image generation unit 144 generates a new edited moving image by adding the identified part to the edited moving image that is currently registered (step S71). There is a probability that the user selects the link 120 because the user wants to see a part that is not included in the edited moving image. Therefore, the part that is added to the new edited moving image is what the user probably wants to see from among parts that are not included in the current edited moving image. Next, the moving image generation unit 144 proceeds to step S66. At this time, the moving image generation unit 144 rewrites the edited moving image registered in the moving image DB 12c with the new edited moving image. Then, the moving image generation unit 144 ends the edited moving image generation process.

Next, as shown in FIG. 5C, the content of the process of changing the reproduction start position of the moving image will be described. In this case, the system control unit 14 need not perform the edited moving image generation process shown in FIG. 10. In the sale item page transmission process shown in FIG. 9, after step S37, the browsed part identification unit 142 determines whether or not there are a predetermined number or more of browse histories that include the reproduction information. At this time, if the browsed part identification unit 142 determines that there are not the predetermined number or more of browse histories that include the reproduction information, the browsed part identification unit 142 proceeds to step S40. On the other hand, if the browsed part identification unit 142 determines that there are the predetermined number or more of browse histories that include the reproduction information, the browsed part identification unit 142 identifies a part that has been often seen in the original moving image. Next, the browsed part identification unit 142 identifies the reproduction position of the head of the part that has been often seen. In the HTML document of the sale item page, for example, a script to reproduce a moving image is described. The moving image generation unit 144 adds the identified reproduction position in the script as the reproduction start position. The transmission unit 145 transmits the HTML document in which the reproduction start position is added to the user terminal 3 (step S40). When the sale item page is displayed, if the user selects a button to reproduce the moving image, the user terminal 3 executes the script to reproduce the moving image. Then, the user terminal 3 transmits a request including the added reproduction start position to the online shopping mall server 1. When the online shopping mall server 1 transmits the moving image, the online shopping mall server 1 starts the transmission of the moving image from a part corresponding to the reproduction start position transmitted from the user terminal 3. Thereby, the user terminal 3 starts the reproduction of the moving image from the head of the part that has been often seen.

As described above, according to the present embodiment, the system control unit 14 determines whether or not the request user who requests the sale item page has purchased the specified sale item, identifies a part that has been seen in the sale item page on the basis of the browse histories that include the browsed part information indicating the displayed part in the sale item page after the purchase of the specified sale item, and causes the user terminal 3 to display the sale item page in a state in which the identified part is seen more preferentially when it is determined that the request user has purchased the specified sale item than when it is determined that the request user has not purchased the specified sale item. Therefore, a user can easily find a part which the user wants to see from the sale item page of an item for sale purchased by the user.

Among items for sale, there is an item for sale which a user basically purchases only once. Examples of this item for sale include a bicycle and a refrigerator. After a user purchases such an item for sale, when the user browses the sale item page, basically the user does not intend to purchase the item for sale. Therefore, there is a high probability that a part seen by a user who has not purchased the item for sale is different from a part seen by a user who has purchased the item for sale. In this case, even if the arrangement of components in the sale item page determined by a shop is suitable for users who have not purchased the item for sale, it is possible to provide highly useful information to users who have purchased the item for sale.

On the other hand, there is an item for sale which a user purchases many times. Examples of this item for sale include a foodstuff and a consumable item. After a user purchases such an item for sale, when the user browses the sale item page, the user may intend to purchase the item for sale again. Therefore, there is a probability that a part seen by a user who has not purchased the item for sale is not so much different from a part seen by a user who has purchased the item for sale. However, even in this case, the part that has seen in the sale item page is identified after the purchase of the item for sale on the basis of the browse histories after the purchase, so that no problem occurs. The reason of this is that the browse histories after the purchase include the browse histories of users who intend to purchase the item for sale again.

As described above, according to the present embodiment, for example, it is possible to provide information more suitable for a user than in a case in which a shop determines a part to be seen before purchase and a part to be seen after purchase and the shop creates a sale item page for a user before purchase and a sale item page for a user after purchase.

Further, the system control unit 14 identifies a part that has been seen in the moving image on the basis of the browse histories that include the browsed part information indicating the reproduced part in the moving image after the purchase of the specified sale item and causes the user terminal 3 to reproduce the moving image in a state in which the identified part is reproduced more preferentially when it is determined that the request user has purchased the specified sale item than when it is determined that the request user has not purchased the specified sale item. Therefore, a user can easily find a part which the user wants to see from a moving image included in the sale item page of an item for sale purchased by the user.

Further, the system control unit 14 causes the sale item page to be displayed in the display area 200 so that the identified part is included in the display area 200 in which the sale item page can be scrolled and displayed. Thereby, the user need not perform a scroll operation to see a part which the user wants to see.

Further, the system control unit 14 changes the position of the identified part in the sale item page to a position that is more easily seen than other parts in the sale item page. Therefore, the request user can easily find a part which the request user wants to see.

In the embodiment described above, the online shopping mall server 1 causes a sale item page suitable for a user who has purchased an item for sale to be displayed. However, the online shopping mall server 1 may cause the user terminal 3 to display a sale item page suitable for a user who has not purchased an item for sale in addition to a sale item page suitable for a user who has purchased an item for sale. Specifically, in step S33 in the sale item page transmission process shown in FIG. 9, if the purchase determination unit 141 determines that there is no purchase history indicating that the request user has purchased the specified sale item (step S33: NO), the browsed part identification unit 142 searches the browse history DB 12d for browse histories when the specified sale item has not been purchased. Then, the browsed part identification unit 142 performs the same processes as those in steps S35 and S36 on the basis of the found browse histories.

In this way, the system control unit 14 identifies a part that has been seen in the sale item page on the basis of the browse histories that include the browsed part information indicating the displayed part of the sale item page when the specified sale item has not been purchased and causes the sale item page to be displayed in a state in which the identified part is seen more preferentially when it is determined that the request user has not purchased the specified sale item than when it is determined that the request user has purchased the specified sale item. In this case, a user can easily find a part which the user wants to see from a web page of an item for sale which the user has not purchased.

The online shopping mall server 1 may cause a moving image suitable for a user who has not yet purchased an item for sale to be displayed. In this case, there are an edited moving image suitable for a user who has purchased an item for sale and an edited moving image suitable for a user who has not purchased an item for sale. Specifically, the system control unit 14 performs basically the same process as the edited moving image generation process shown in FIG. 10 in order to generate an edited moving image suitable for a user who has not purchased an item for sale. However, in steps S62 and S67, the system control unit 14 searches for browse histories where the object sale item has not purchased.

In the embodiment described above, the online shopping mall server 1 causes a sale item page suitable for a user who has purchased an item for sale to be displayed as well as causes a moving image suitable for a user who has purchased an item for sale to be reproduced. However, the online shopping mall server 1 may cause only one of the sale item page and the moving image to be displayed to be suitable for a user who has purchased an item for sale.

In the embodiment described above, the contents of the present invention are applied to the sale item page. However, the contents of the present invention may be applied to, for example, a moving image related to the item for sale. In other words, the contents of the present invention may include only a moving image.

In the embodiment described above, the online shopping mall server 1 generates a sale item page suitable for a user who has purchased an item for sale every time receiving a request of the sale item page from the user terminal 3 used by the user who has purchased the item for sale. However, for example, the online shopping mall server 1 may periodically generate a sale item page suitable for a user who has purchased an item for sale.

In the embodiment described above, the purchase state is included in the browse history. However, the purchase state need not be included in the browse history. In this case, online shopping mall server 1 can determine whether or not the browse history is a browse history after purchase by searching the purchase history DB 12e for a purchase history by using the user ID, the shop ID, and the sale item ID included in the browse history.

In the embodiment described above, the present invention is applied to the online shopping mall in which items for sale are sold from a plurality of shops. However, the present invention may be applied to a web site of electronic commerce in which items for sale are sold from a single distributor.

REFERENCE SIGNS LIST

1 Online shopping mall server
2 Shop terminal
3 User terminal
11 Communication unit
12 Storage unit
12a Member information DB
12b Sale item information DB
12c Moving image DB
12d Browse history DB
12e Purchase history DB
13 Input/output interface
14 System control unit
14a CPU
14b ROM
14c RAM
15 System bus
141 Purchase determination unit
142 Browsed part identification unit
143 Sale item page generation unit
144 Moving image generation unit
145 Transmission unit
146 Browse history recording unit
NW Network
S Information processing system

The invention claimed is:

1. An information processing apparatus, including at least one processor, comprising:
a determination unit, within said processor, that receives user identification information identifying a user and a request for contents and determines whether or not the user who requests contents including information of an item for sale has purchased the item for sale using a purchase history of the user, the purchase history information incorporating the user identification information and item identification information identifying previously purchased items by the user;
an identification unit, within said processor, that identifies, on the basis of a history information of at least one other user other than the user indicating a part of the contents displayed after purchase of the item for sale by the at least one other user, a part of the contents displayed after purchase of the item for sale; and
a control unit, within said processor, that causes the contents to be displayed on a display,
wherein the control unit transmits an HTML document of the requested contents to a terminal device of the user to cause the contents to be displayed on a display, and
wherein, when it is determined by the determination unit that the user has purchased the item for sale, the control unit includes into the HTML document a script that is automatically run, and causes to automatically scroll through the contents to display, on the display of the terminal device, the part identified by the identification unit, and thereby causes the contents to be displayed on the display in a state in which the part identified by the identification unit is seen more preferentially than when it is determined that the user has not purchased the item for sale.

2. The information processing apparatus according to claim 1, wherein
the contents include at least a moving image,
the identification unit identifies, on the basis of the history indicating at least a reproduced part of the moving image, a part that has been seen after purchase of the item for sale in the moving image, and
when it is determined by the determination unit that the user has purchased the item for sale, the control unit causes the moving image to be reproduced in a state in which the part identified by the identification unit is preferentially reproduced.

3. The information processing apparatus according to claim 2, wherein
when it is determined by the determination unit that the user has purchased the item for sale, the control unit causes the contents to be displayed, in an area in which scrolling display of the contents can be performed, so that the part identified by the identification unit is included in the area.

4. The information processing apparatus according to claim 2, wherein
when it is determined by the determination unit that the user has purchased the item for sale, the control unit changes a position, in the contents, of the part identified by the identification unit to a position that is more easily seen than other parts of the contents.

5. The information processing apparatus according to claim 2, further comprising:
a second identification unit, within said processor, that identifies, on the basis of the history indicating a displayed part of the contents at a time when the item for sale has not been purchased, a part that has been seen in the contents, wherein the control unit causes the contents to be displayed in a state in which the part identified by the second identification unit is seen more preferentially when it is determined by the determination unit that the user has not purchased the item for sale than when it is determined that the user has purchased the item for sale.

6. The information processing apparatus according to claim 1, wherein when it is determined by the determination unit that the user has purchased the item for sale, the control unit causes the contents to be displayed, in an area in which scrolling display of the contents can be performed, so that the part identified by the identification unit is included in the area.

7. The information processing apparatus according to claim 6, further comprising:

a second identification unit, within said processor, that identifies, on the basis of the history indicating a displayed part of the contents at a time when the item for sale has not been purchased, a part that has been seen in the contents, wherein the control unit causes the contents to be displayed in a state in which the part identified by the second identification unit is seen more preferentially when it is determined by the determination unit that the user has not purchased the item for sale than when it is determined that the user has purchased the item for sale.

8. The information processing apparatus according to claim 1, wherein when it is determined by the determination unit that the user has purchased the item for sale, the control unit changes a position, in the contents, of the part identified by the identification unit to a position that is more easily seen than other parts of the contents.

9. The information processing apparatus according to claim 8, further comprising:

a second identification unit, within said processor, that identifies, on the basis of the history indicating a displayed part of the contents at a time when the item for sale has not been purchased, a part that has been seen in the contents, wherein the control unit causes the contents to be displayed in a state in which the part identified by the second identification unit is seen more preferentially when it is determined by the determination unit that the user has not purchased the item for sale than when it is determined that the user has purchased the item for sale.

10. The information processing apparatus according to claim 1, further comprising:

a second identification unit, within said processor, that identifies, on the basis of the history indicating a displayed part of the contents at a time when the item for sale has not been purchased, a part that has been seen in the contents, wherein the control unit causes the contents to be displayed in a state in which the part identified by the second identification unit is seen more preferentially when it is determined by the determination unit that the user has not purchased the item for sale than when it is determined that the user has purchased the item for sale.

11. An information processing method performed by a computer, including at least one processor, the method comprising:

receiving, using at least one of said at least one processor, user identification information identifying a user and a request for contents;

determining, using at least one of said at least one processor, whether or not the user who requests contents including information of an item for sale has purchased the item for sale using a purchase history of the user, the purchase history incorporating the user identification information and item identification information identifying previously purchased items by the user;

identifying, using at least one of said at least one processor, on the basis of a history information of at least one other user other than the user indicating a part of the contents displayed after purchase of the item for sale by the at least one other user, a part of the contents displayed after purchase of the item for sale;

transmitting, using at least one of said at least one processor, an HTML document of the requested contents to a terminal device of the user to cause the contents to be displayed on a display, and displaying, using at least one of said at least one processor, the contents on a display, wherein, when it is determined that the user has purchased the item for sale, the displaying further comprises including into the HTML document a script that automatically runs, and causes to automatically scroll through the contents to display, on the display of the terminal device, the part identified by the identification unit, thereby causing the contents to be displayed on the display in a state in which the identified part is seen more preferentially than when it is determined that the user has not purchased the item for sale.

12. An information processing apparatus, including at least one processor, comprising:

a determination unit, within said processor, that receives user identification information identifying a user and a request for contents and determines whether or not the user who requests contents including information of an item for sale has purchased the item for sale using a purchase history of the user, the purchase history information incorporating the user identification information and item identification information identifying previously purchased items by the user;

an identification unit, within said processor, that identifies, on the basis of a history information of at least one other user other than the user indicating a part of the contents displayed after purchase of the item for sale by the at least one other user, a part of the contents displayed after purchase of the item for sale; and a control unit, within said processor, that causes the contents to be displayed on a display, wherein the control unit transmits an HTML document of the requested contents to a terminal device of the user to cause the contents to be displayed on a display, and wherein, the control unit includes into the HTML document a script that is automatically run in response to the determination unit determining the user has purchased the item for sale, and causes to automatically modify the contents and automatically scroll through the contents to display, on the display of the terminal device, the part identified by the identification unit, and thereby causes the contents to be displayed on the display in a state in which the part identified by the identification unit is seen more preferentially than when it is determined that the user has not purchased the item for sale.

* * * * *